July 28, 1931.  G. C. MAGNESS ET AL  1,816,735
VARIABLE SPEED TRANSMISSION UNIT
Filed March 23, 1929   3 Sheets-Sheet 1
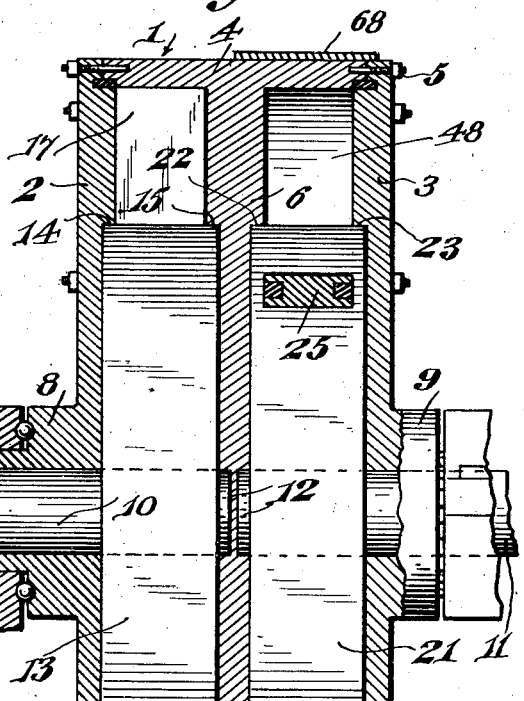
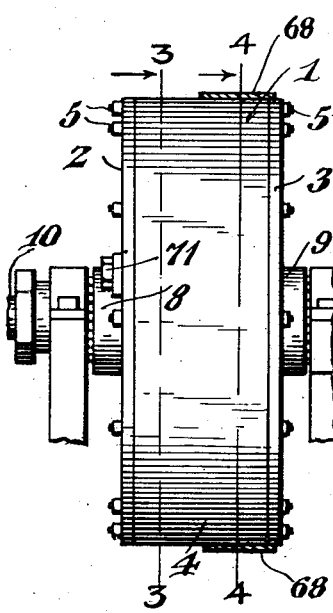
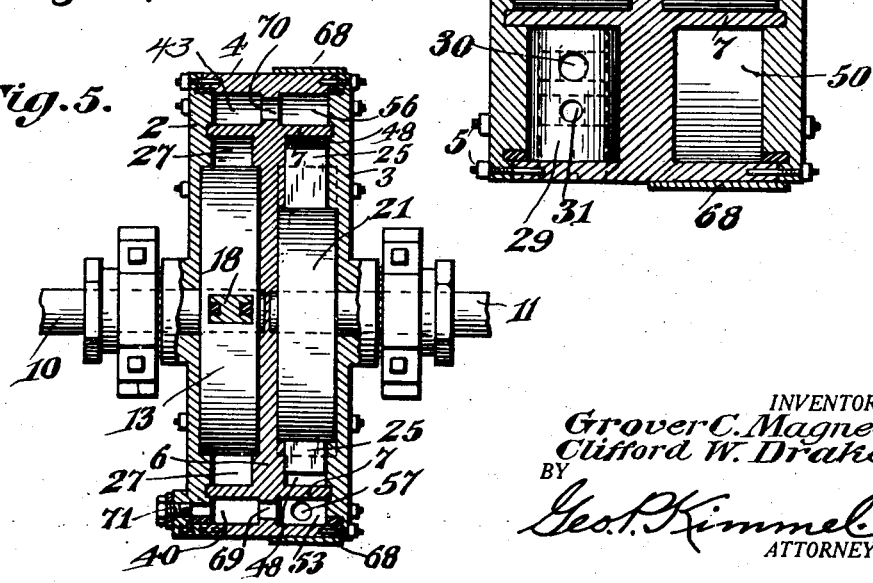
INVENTORS
Grover C. Magness
Clifford W. Drake,
BY
Geo. P. Kimmel
ATTORNEY.

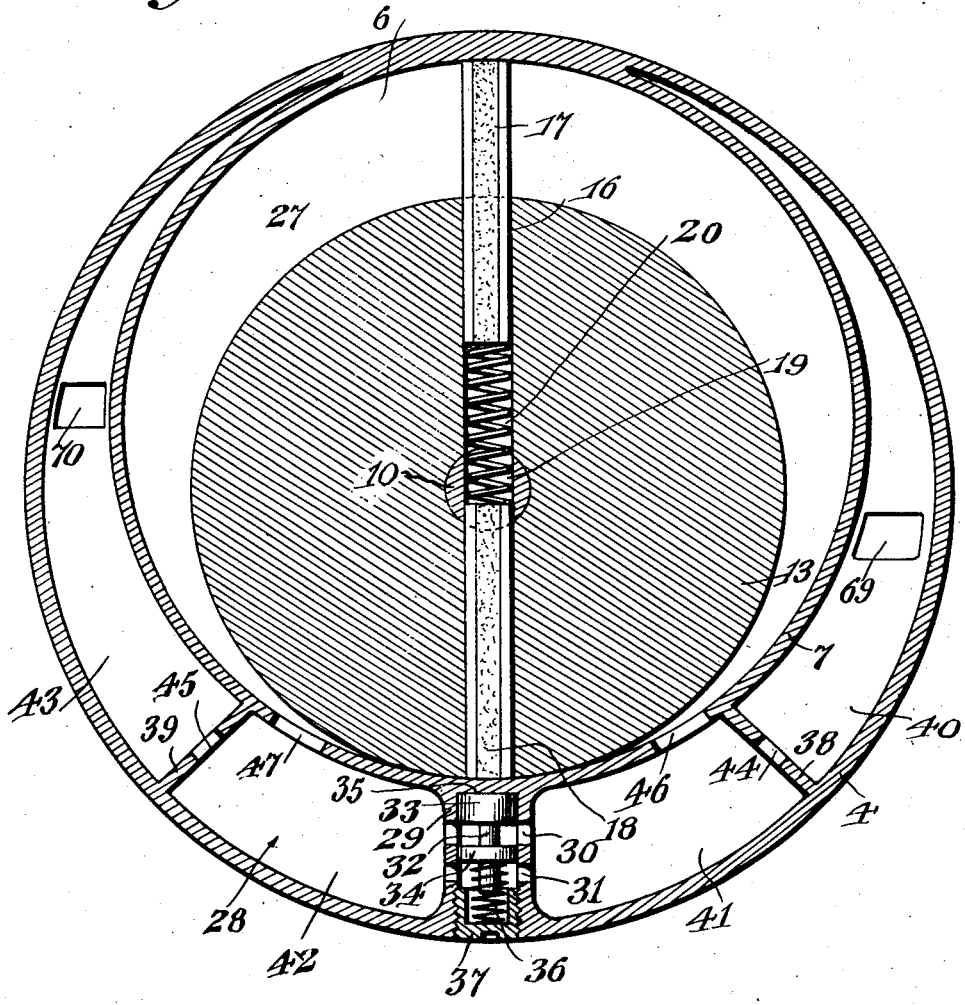

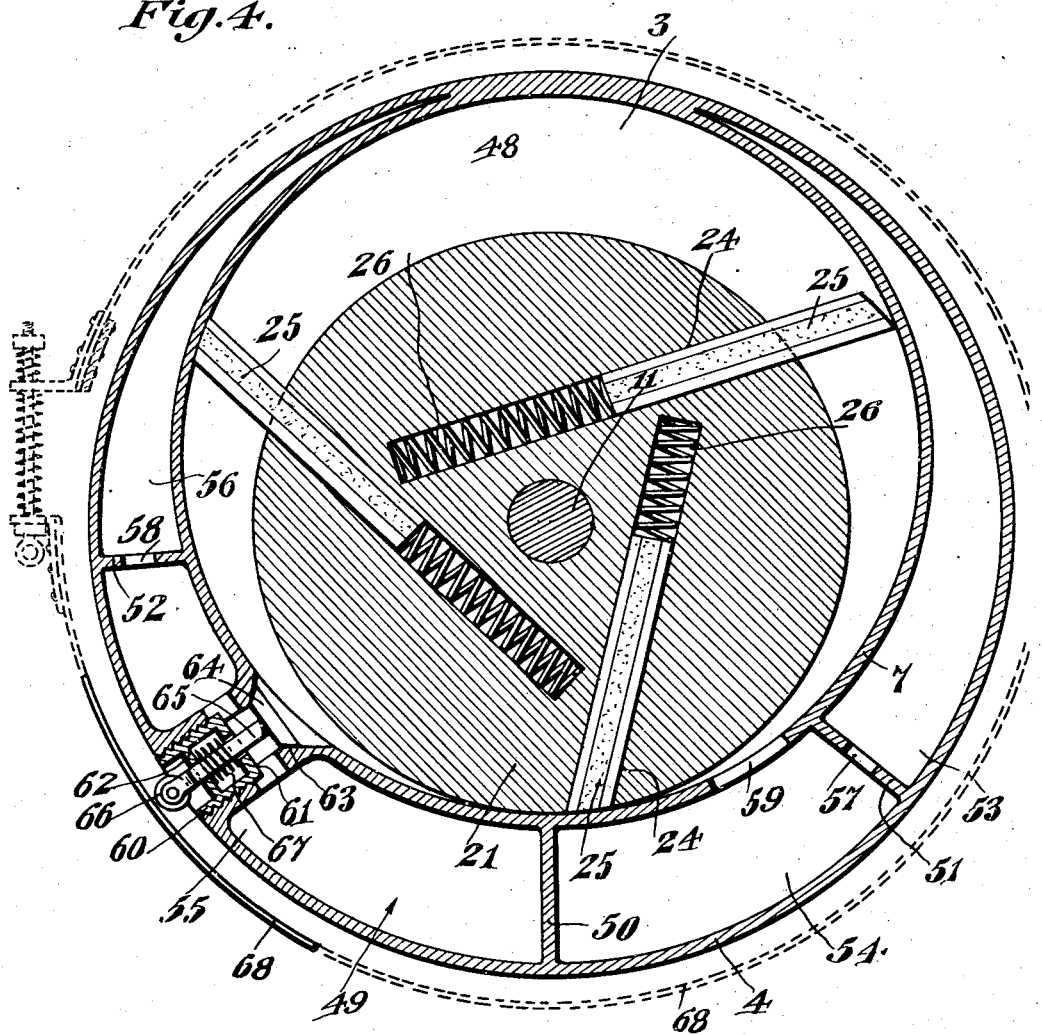

Patented July 28, 1931

1,816,735

UNITED STATES PATENT OFFICE

GROVER C. MAGNESS AND CLIFFORD W. DRAKE, OF MITCHELL, LOUISIANA

VARIABLE SPEED TRANSMISSION UNIT

Application filed March 23, 1929. Serial No. 349,491.

This invention relates to a variable speed transmission unit and has for one of its objects to provide, in a manner as hereinafter set forth, a transmission unit of such class whereby power may be gradually transmitted to a driven shaft to operate the same with either a forward or a reverse motion, whereby changing from one motion to the other serves as a brake.

A further object of this invention is to provide a device of the abovenamed character of such class as to be adaptable to motor vehicles so constructed as to allow low speeds to give the driving parts lead, or to gain revolutions, on the driven parts, thereby eliminating the necessity of shifting gears and the danger of stalling the vehicle in hazardous places from a failure to shift gears.

A further object of this invention is to provide a variable speed power transmission unit adaptable to stationary motors whereby power may be turned on full and speed be gradually and automatically transmitted to load.

With the foregoing and other objects in view, the invention consists of the novel construction, combination and arrangement of parts as hereinafter more particularly described, and as illustrated in the accompanying drawings wherein is shown an embodiment of the invention, but it is to be understood that such description and drawings are to be taken as illustrative, and that the invention is intended to be limited only by the scope of the claims hereunto appended.

In the accompanying drawings in which like numerals are employed to designate like parts throughout the same:

Figure 1 is an elevation of a transmission unit in accordance with this invention.

Figure 2 is an enlarged vertical section therethrough.

Figure 3 is a section taken on line 3—3 Figure 1.

Figure 4 is a section taken on line 4—4 Figure 1.

Figure 5 is a substantially horizontal section.

Referring to the drawings in detail, the numeral 1 designates generally a casing which is substantially drum-like in form and which consists of a forward circular wall 2, a rear circular wall 3, and an annular peripheral wall 4 which is secured by suitable holdfast devices 5 to the marginal portions of the walls 2 and 3. Preferably formed integrally with the wall 4 is a partition 6 which divides the interior of the casing 1 into a pair of compartments. Preferably formed integrally with the partition 6 is an annular inner wall 7 which is disposed eccentrically with respect to the wall 4 and preferably formed integrally therewith.

The walls 2 and 3 respectively are formed with bearings 8 and 9 by means of which the casing is mounted on a drive shaft 10 and a driven shaft 11. The shafts 10 and 11 extend into the casing and have their inner ends journaled into the partition 6 as indicated at 12. The shafts 10 and 11 are disposed in concentric relation to the annular wall 4.

Concentrically mounted on the shaft 10 to rotate therewith is a disk 13, the periphery of which is in contact at one point with the eccentric wall 7 and the forward and rearward faces of which are projected into a pair of recesses 14 and 15 respectively formed in the rearward face of the wall 2 and the forward face of the partition 6. The disk 13 is formed with a diametrically extending opening 16 for the reception therein of a pair of impeller blades 17 and 18. The opening 16 extends through the shaft 10 as indicated at 19. Interposed between the inner ends of the blades 17 and 18 is a relatively strong coiled spring 20, the compression of which exerts an outward pressure on the blades 17 and 18 to maintain the latter in engagement with the inner face of the eccentric wall 7. The blades 17 and 18 are of a width substantially equal to the distance between the wall 2 and the partition 6 and when projected beyond the periphery of the disk 13 the blades are in contact with the inner faces of the wall 2 and partition 6.

Concentrically mounted on the shaft 11 to rotate therewith is a disk 21, the periphery of which is in contact at one point with the eccentric wall 7 and the forward and rearward faces of which are projected into a pair of recesses 22 and 23 respectively formed in the rearward face of the partition 6 and the forward face of the wall 3. Formed in the disk 21 is a plurality of elongated openings 24, which extend from the periphery of the disk at an angle to the diameter thereof and are arranged with respect to each other so that each is intersected by the longitudinal plane of one of the others. Extending into each of the openings 24 is an impeller blade 25, the outer end of which is maintained in engagement with the inner face of the eccentric wall 7 by means of a relatively heavy coiled spring 26 which is interposed between the inner end of the blade 25 and the end wall of the opening.

The arrangement of the walls 4 and 7 and the disk 13 with respect to each other divides the space between the walls 2 and 4 and partition 6 into a pair of oppositely disposed, substantially crescent shaped spaces 27 and 28. Substantially midway the length of the space 28 is a cylindrical housing 29 which is preferably formed integrally with the walls 4, 7 and 2 and partition 6. Spaced from the inner end thereof the casing 29 is formed with a pair of diametrically opposite ports 30 and spaced from the outer end thereof the casing 29 is formed with a pair of diametrically opposite ports 31. Disposed within the casing 29 is a plunger 32 which is provided with a pair of spaced pistons 33 and 34. The piston 33 is normally maintained against its seat 35 by means of a coiled spring 36, the respective ends of which abut against the outer face of the piston 34 and the inner face of a cap 37 threaded through the wall 4 and extending within the casing 29. The ports 30 are of materially greater diameter than the ports 31 and the piston 33 is of materially greater thickness than the thickness of the piston 34. The thickness of the piston 34 is substantially equal to the diameter of the ports 31 while the thickness of the piston 33 is greater than the diameter of the ports 30.

Disposed on either side of the casing 29 is a pair of dividing walls 38 and 39 which in conjunction with the casing 29 divide the space 28 into a plurality of sub-spaces 40, 41, 42 and 43. An opening 44 is formed in the dividing wall 38 by means of which communication is established between the spaces 40, 41. A similar opening 45 is provided in the wall 39 by means of which communication is established between the spaces 42 and 43. Extending through the eccentric wall 7, at one side of the partition 6, is an opening 46, by means of which communication is established between the spaces 41 and 27. A similar opening 47 is provided in the eccentric wall 7 by means of which communication is established between the spaces 42 and 27.

Due to the relative arrangement of the walls 4 and 7 and disk 21, the space between the walls 4 and 3 and partition 6 is divided into a pair of oppositely disposed, substantially crescent shaped spaces 48 and 49. Substantially midway the ends of the space 49 is a dividing wall 50 which extends between the walls 4 and 7 and partition 6 and wall 3. Disposed on opposite sides of the dividing wall 50 is a pair of dividing walls 51 and 52 which in conjunction with the wall 50 divides the space 49 into a plurality of sub-spaces 53, 54, 55 and 56. The dividing wall 51 is formed with an opening 57 by means of which communication is established between the spaces 53 and 54. The dividing wall 52 is formed with an opening 58 by means of which communication is established between the spaces 55 and 56. Extending through the eccentric wall 7, at one side of the partition 6, is an opening 59 by means of which communication is established between the spaces 54 and 48.

The space 55 is of materially greater length than the space 54 and projecting thereinto is a cap 60 which extends through the wall 4 in threaded engagement therewith. The cap 60 is formed at its inner end with a transverse wall 61 and is further formed intermediate its ends with a transverse wall 62 which is arranged in spaced relation to the wall 61. In opposing relation to the cap 60, the eccentric wall 7 is formed with an opening 63 which provides a seat for a valve 64. The valve 64 is provided with a stem 65 which extends through the transverse walls 61 and 62 and is provided at its outer end with a roller 66. The valve 64 is normally maintained on its seat by means of a coiled spring 67 which is disposed between the walls 61 and 62 in concentric relation to the stem 65. One end of the spring 67 is fixedly secured to the stem 65 and the other end of the spring is in abutment with the outer face of the wall 61 whereby the compression of the spring normally forces the stem 65 in an outward direction to maintain the valve 64 upon its seat.

When the valve is seated, the roller 66 is maintained in contact with the inner face of a normally expanded brake band 68 which may be mounted in any suitable manner in concentric relation to the wall 4. When the valve 64 is lifted from its seat communication is established between the spaces 48 and 55. At substantially diametrically opposite points, the partition 6 is formed with a pair of openings 69 and 70 both of which are located in that portion of the partition 6 which extends between the walls 4 and 7. The opening 69 provides for communication between the spaces 40 and 53 and the opening 70 provides communication between the spaces 56 and 43. The wall 2 is provided with a plug 71, which may be removed for supplying a fluid, preferably oil, to the interior of the casing. It is contemplated that the spaces 27, 28, 48 and 49 be practically filled with oil before the device is put in operation.

From the foregoing description it will be readily apparent that each of the disks 13 and 21 is provided with a chamber partially surrounded by and in communication with a plurality of compartments. The chamber for the disk 13 is the space 27, and the compartments partially surrounding the chamber are the sub-spaces 40, 41, 42 and 43. The space 41 provides a discharge compartment for the chamber 27 and the space 42 provides an inlet chamber therefor. The disk 13 drives the blades 17 and 18 carried thereby while the latter exert an impelling action on the fluid within the chamber to force it therethrough.

The chamber for the disk 21 is the space 48 and the compartments partially surrounding the chamber are the sub-spaces 53, 54, 55 and 56. The space 54 provides an inlet compartment for the chamber 48 and is in communication with the discharge compartment for the chamber 27. The space 55 provides a discharge compartment for the chamber 48 and is in communication with the inlet compartment for the chamber 27. The blades 25 are actuated by the fluid passing through the chamber 48 and impel the disk 21.

In the operation of my device, power is transmitted in any suitable manner to the drive shaft 10 which sets up a rotation of the disk 13 within the casing 1. Upon the rotation of the disk 13 oil is drawn from the space 42 into the space 27 through the opening 47 and is forced from the space 27 into the space 41 through the opening 46 by the action of the blades 17 and 18. With the valve 64 seated there is no outlet for the oil through the openings 44 and 69, therefore the oil must seek its outlet from the space 41 through the ports 30 and 31 into the space 42. As the oil cannot escape through the ports 30 and 31 as fast as it is being forced through the opening 46, a slow rotating movement will be imparted to the casing 1 which gradually increases in speed. As the speed of rotation of the casing 1 increases, the pistons 33 and 34 will be moved outwardly by centrifugal force against the compression of the spring 36 and when the pistons have been moved outwardly a sufficient distance to completely close the ports 30 and 31 the speed of rotation of the casing 1 will equal that of the disk 13.

As relative movement between the casing 1 and disk 21 is prevented while the valve 64 is seated, the disk 21 will be rotated with the casing 1 thereby driving the shaft 11 in the same direction as the shaft 10. Upon an increase in the speed of the shaft 10, the pistons 33 and 34 will be moved by centrifugal force to the extreme limit of their outward travel. In this position the ports 30 will remain closed by the piston 33 but the ports 31 will be partially open thereby providing a by-pass from the space 41 into the space 42 which serves as a governor. The size of the by-pass may be regulated by manipulation of the cap 37 in order to provide for any speed desired for the driven shaft by direct drive.

If it is desired to cut off the transmission of the power to the driven shaft 11, the brake band 68 may be contracted which through its contact with the roller 66 lifts the valve 64 from its seat to provide an outlet for the oil within the space 48. At the same time the casing 1 is prevented from rotating by the gripping action of the brake band 68 thereon and the oil will be forced from the space 41 through the openings 44, 69, 57 and 59 into the space 48 where it resists and ultimately stops the rotation of the disk 21 by obstructing the travel of the blades 25.

If the power being applied to the shaft 10 is continued, the action of the oil in the space 48 against the blades 25 will cause the disk 21 to be rotated in a direction opposite to the direction of the shaft 10, thereby establishing a reverse drive. During the reverse driving of the disk 21 and shaft 11, the oil is drawn through the opening 63 about the valve 64 and returned to the space 27 through the openings 58, 70, 45 and 47. If it is desired to apply a brake to the reverse motion of the shaft 11, this may be accomplished by expanding the brake band 68 which permits the spring 67 to close the valve 64 thereby building up a pressure of the oil within the space 48 which prevents movement of the blades 25 relative to the casing 1.

It is thought that the many advantages of a variable speed transmission unit in accordance with this invention will be readily apparent, and although the preferred embodiment is as illustrated and described, yet it is to be understood that various changes may be made in the size, shape and arrangement of parts, so long as such changes fall within the scope of the invention as defined in the appended claims.

What we claim is:

1. A variable speed transmission unit comprising, a housing having circular front and rear walls and an annular peripheral wall, a circular partition parallel to the front and rear walls to divide the interior of the housing into a driving compartment and a driven compartment, an annular partition integral with the circular partition and eccentrically disposed with respect to the peripheral wall to divide each compartment into a disk chamber and a fluid passage chamber, a driving disk within the disk chamber of the driving compartment and having a peripheral portion in contact with said annular partition, fluid impelling blades projecting from the periphery of the driving disk into contact with said annular partition, a driven disk within the disk chamber of the driven compartment and having a peripheral portion in contact with said annular partition, fluid impelled blades projecting from the periphery of the driven disk into contact with said annular partition, said annular partition having sets of spaced openings to establish communication between the chambers of each compartment on opposite sides of the contacting peripheral portions of said disks with respect to the annular partition, said circular partition having spaced openings to establish communication between said fluid passage chambers, and means for controlling the passage of fluid through said chambers to prevent the fluid from actuating the fluid impelled blades and to provide for the rotation of the disks and housing as a unit, said means including a normally closed valve for preventing the passage of fluid from the driven disk chamber.

2. A variable speed transmission unit comprising, a housing having circular front and rear walls and an annular peripheral wall, a circular partition parallel to the front and rear walls to divide the interior of the housing into a driving compartment and a driven compartment, an annular partition integral with the circular partition and eccentrically disposed with respect to the peripheral wall to divide each compartment into a disk chamber and a fluid passage chamber, a driving disk within the disk chamber of the driving compartment and having a peripheral portion in contact with said annular partition, fluid impelling blades projecting from the periphery of the driving disk into contact with said annular partition, a driven disk within the disk chamber of the driven compartment and having a peripheral portion in contact with said annular partition, fluid impelled blades projecting from the periphery of the driven disk into contact with said annular partition, said annular partition having sets of spaced openings to establish communication between the chambers of each compartment on opposite sides of the contacting peripheral portions of said disks with respect to the annular partition, said circular partition having spaced openings to establish communication between said fluid passage chambers, a normally closed valve for preventing the passage of fluid from the driven disk chamber and to provide for the rotation of the disks and housing as a unit, and a brake element for engagement with the housing to prevent rotation of the latter, said brake element when applied operating to open said normally closed valve.

In testimony whereof, we affix our signatures hereto.

GROVER C. MAGNESS.
CLIFFORD W. DRAKE.